United States Patent
Young, IV

(10) Patent No.: US 7,825,337 B2
(45) Date of Patent: Nov. 2, 2010

(54) CABLE MANAGEMENT APPARATUSES AND SYSTEMS

(75) Inventor: James A. Young, IV, Everett, WA (US)

(73) Assignee: Slam Brands, Inc., Redmond, WA (US)

( * ) Notice: Subject to any disclaimer, the term of this patent is extended or adjusted under 35 U.S.C. 154(b) by 325 days.

(21) Appl. No.: 11/877,446

(22) Filed: Oct. 23, 2007

(65) Prior Publication Data
US 2009/0101404 A1  Apr. 23, 2009

(51) Int. Cl.
*H02G 3/04* (2006.01)
(52) U.S. Cl. .................. 174/72 A; 174/480; 174/135; 385/134; 385/135; D8/356
(58) Field of Classification Search .............. 174/481, 174/480, 101, 135, 72 A, 72 R, 68.1, 68.3, 174/97, 504; 385/134, 135; 52/220.7; 439/719, 439/445; D8/356, 358
See application file for complete search history.

(56) References Cited

U.S. PATENT DOCUMENTS

| | | | |
|---|---|---|---|
| 5,640,482 A * | 6/1997 | Barry et al. | 385/135 |
| 6,012,683 A | 1/2000 | Howell | |
| 6,398,149 B1 * | 6/2002 | Hines et al. | 385/135 |
| 6,545,863 B2 | 4/2003 | Huggins | |
| 6,615,551 B2 | 9/2003 | Chesser et al. | |
| 6,850,687 B2 * | 2/2005 | Lavoie | 385/135 |
| 6,870,095 B1 * | 3/2005 | Whitted | 174/481 |
| 6,964,588 B2 * | 11/2005 | Follingstad et al. | 439/719 |
| 6,996,904 B1 | 2/2006 | Howell | |
| 7,026,553 B2 | 4/2006 | Levesque et al. | |
| 7,059,895 B2 | 6/2006 | Murano | |
| 7,359,610 B2 * | 4/2008 | Vongseng | 385/135 |
| D569,712 S * | 5/2008 | Young, IV | D8/358 |
| D573,448 S * | 7/2008 | Young, IV | D8/356 |
| 7,417,188 B2 * | 8/2008 | McNutt et al. | 174/68.1 |
| 7,565,051 B2 * | 7/2009 | Vongseng | 385/135 |

* cited by examiner

*Primary Examiner*—Angel R Estrada
(74) *Attorney, Agent, or Firm*—Turocy & Watson, LLP

(57) ABSTRACT

Several one-piece unitary easily manufactured and economical products that both facilitate the routing of cable and the storage of extra lengths of cable are provided wherein a cable management apparatus includes a centrally disposed first cable confinement portion mountable to a surface, a second cable confinement portion extending from a first side of the first cable confinement portion, and a third cable confinement portion extending from a second side of the first cable confinement portion opposite the first side such that the first, second, and third cable confinement portions are substantially aligned. Another cable management apparatus includes a stepped mounting member, a first confinement member extending from the stepped mounting member forming a first confinement channel, and a second confinement member extending from the stepped mounting member forming a second confinement channel.

17 Claims, 8 Drawing Sheets

CABLE MANAGEMENT APPARATUSES AND SYSTEMS

FIELD OF THE INVENTION

The present innovation is directed generally to entertainment and/or multimedia furniture, and more specifically to cable management apparatus that can be employed independently or incorporated or integrated with entertainment center furniture such as for example but not limited to multimedia furniture that houses media devices, consoles, computers, peripherals, and/or media storage.

BACKGROUND OF THE INVENTION

For decades, entertainment devices such as media devices like gaming consoles, games, Digital Video Disk (DVD) players, Compact Disk (CD) players, set top boxes, Surround Sound Stereo devices, Video Cassette Recorders (VCRs) networked and standalone computing devices/components have been continually invading the living room, home offices, bedrooms, basements, conference rooms, commercial spaces, etc. However, at the same time, generally speaking, some of the furniture that has been employed to house these devices and peripherals has remained static in terms of its functionality. For instance, "coffee tables" have largely remained the same. For another example, while the notion of a "TV stand" has existed, i.e., a stand suited for supporting a television (TV), the TV stand in its various formations tends to be little more than a flat surface with shelves or drawers underneath.

Through time, some of the furniture that has been employed to house these devices and peripherals has changed, for example, the TV stand has morphed into entertainment centers that house a plurality of entertainment devices and can include one or more doors on the front to shield the entertainment devices, and other home theatre devices etc. from view and/or from damage. Most if not all of the plurality of entertainment devices plug into a wall outlet to receive electrical power. Additionally, many times other cables interconnect different devices or other data sources such as the Internet, a digital video recorder (DVR), a game console, a display, and/or a computer.

For example, it is not uncommon, to have a satellite receiver having one cable going to a satellite dish and having another cable going to a VCR or DVR that in turn has a cable connected to a game console that can be connected to a display device. Additionally, there can be multiple speaker wires. In some instances, wire management in an entertainment center environment can be very difficult both from a functional aspect and from an aesthetic aspect. Accordingly, for these and other reasons, improved cable management apparatus that can be incorporated or integrated with targeted entertainment centers that house media consoles, peripherals and/or media devices and content are desired. Because the type of wiring employed is limitless, for example, some devices utilize phone lines, as employed herein the term cable means all wiring whatsoever such as coaxial cable, two wire speaker wire, Cat 5 cable, electrical cords, a single wire, etc.

SUMMARY OF THE INVENTION

In various exemplary non-limiting embodiments, the innovation provides a one-piece unitary easily manufactured and economical product that both facilitates the routing of cable and the storage of extra lengths of cable. In various exemplary non-limiting embodiments, the innovation provides a cable management apparatus including a centrally disposed first cable confinement portion mountable to a surface, a second cable confinement portion extending from a first side of the first cable confinement portion, and a third cable confinement portion extending from a second side of the first cable confinement portion opposite the first side such that the first, second, and third cable confinement portions are substantially aligned. The cable management apparatus can be employed in an entertainment center piece of furniture to facilitate the routing and/or storage of cables.

For better integration of media devices having cables to the media devices or from the media devices while the devices are positioned in a multimedia furniture such as an entertainment center, the innovation also may include structure for the routing of cable and the storage of extra lengths of cable. For instance, in one exemplary non-limiting embodiment, a furniture structure for a display device is provided having a main surface for supporting a display device. In a back panel, the furniture structure includes a cutout or slot for receiving a cable for a media device. On the backside of the back panel a plurality of cable management apparatuses can be provided. The cable management apparatuses can be a one-piece unitary easily manufactured and economical product that both facilitates the routing of cable and the storage of extra lengths of cable.

A simplified summary is provided herein to help enable a basic or general understanding of various aspects of exemplary, non-limiting embodiments that follow in the more detailed description and the accompanying drawings. This summary is not intended, however, as an extensive or exhaustive overview. The sole purpose of this summary is to present some concepts related to the various exemplary non-limiting embodiments of the innovation in a simplified form as a prelude to the more detailed description that follows.

BRIEF DESCRIPTION OF THE DRAWINGS

The cable management apparatus that can be employed independently or incorporated or integrated with entertainment center furniture structures of the innovation are further described with reference to the accompanying drawings in which.

DETAILED DESCRIPTION OF ILLUSTRATIVE EMBODIMENTS

Overview

As described in the background, traditional entertainment center furniture has been somewhat tailored to the media equipment space that has evolved in the living spaces everywhere. Typically a media device or console includes data for more than one medium such as data for both video and audio, and as such, the terms multimedia and media are employed interchangeably herein. While some prior art furniture can be provided with generic shelves, drawers and/or swing doors on hinges so that a user can place a console inside on a shelf, in a drawer and/or swing a door shut to enclose the console, such furniture can be generic by nature in that shelves and drawers can house any item. In most cases, a plurality of openings are provided in a back wall to enable cables to be provided to devices inside the furniture as well as to allow power cords to exit the furniture. However organization of the cables has heretofore been problematic.

In various exemplary non-limiting embodiments, the innovation provides a one-piece unitary easily manufactured and economical product that both facilitates the routing of cable and the storage of extra lengths of cable. In various exemplary non-limiting embodiments, the innovation provides a cable management apparatus including a centrally disposed first cable confinement portion mountable to a surface, a second cable confinement portion extending from a first side of the first cable confinement portion, and a third cable confinement portion extending from a second side of the first cable confinement portion opposite the first side such that the first, second, and third cable confinement portions are substantially aligned.

In addition, in another aspect of the innovation, for better integration of media devices having cables to the media devices or from the media devices while the devices are positioned in a multimedia furniture such as an entertainment center, the innovation also may include structure for the routing of cable and the storage of extra lengths of cable. For instance, in one exemplary non-limiting embodiment, a furniture structure for a display device can be provided having a main surface for supporting a display device. In a back panel, the furniture structure includes a cutout or slot for receiving a cable for a media device. On the backside of the back panel a plurality of cable management apparatuses can be provided. The cable management apparatuses can be a one-piece unitary easily manufactured and economical product that both facilitates the routing of cable and the storage of extra lengths of cable.

Exemplary Non-Limiting Hanging Channel Cable Management Apparatus

Figure 1A:
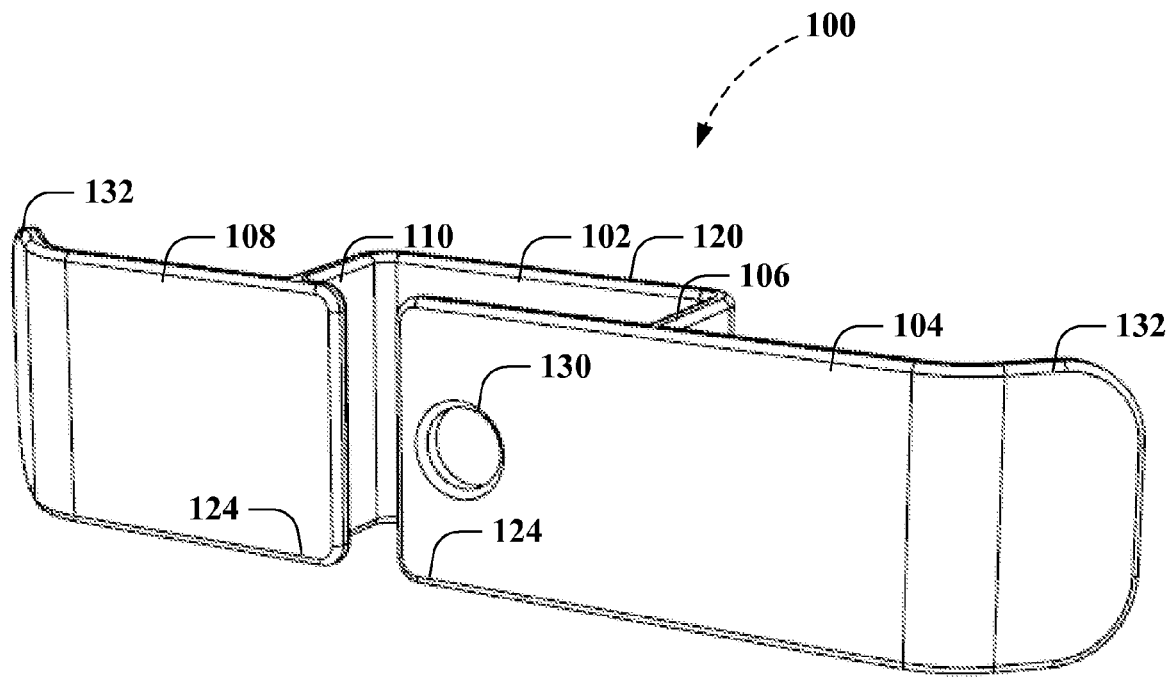
FIG. 1a is a perspective view of a cable management apparatus in accordance with the innovation.
Figure 1B:
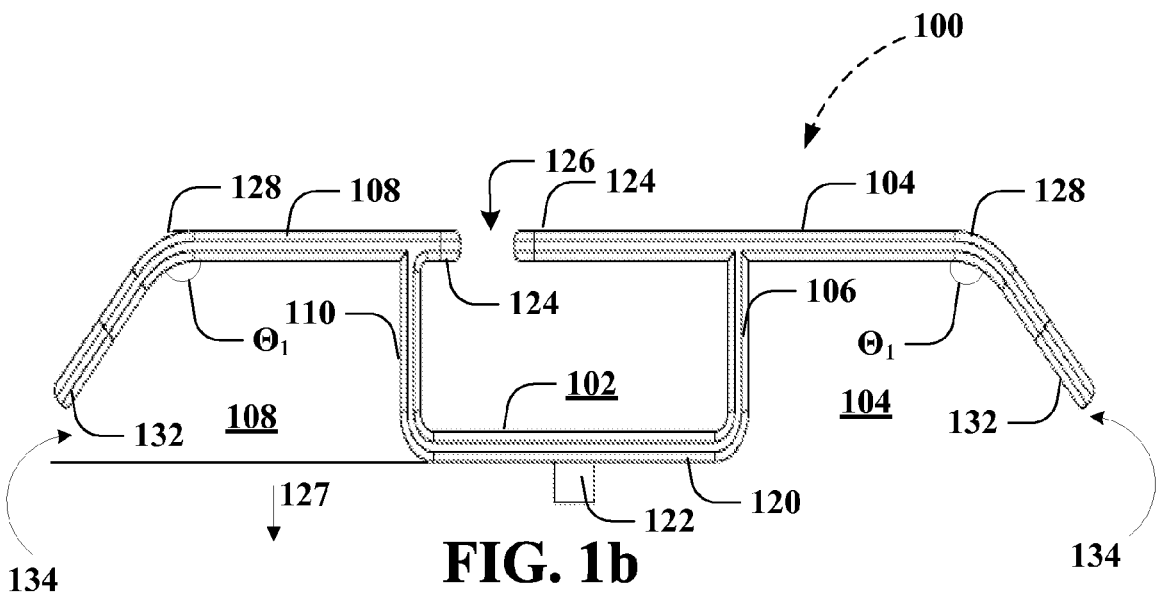
FIG. 1b is a side plan view of a cable management apparatus in accordance with the innovation.
Figure 1C:
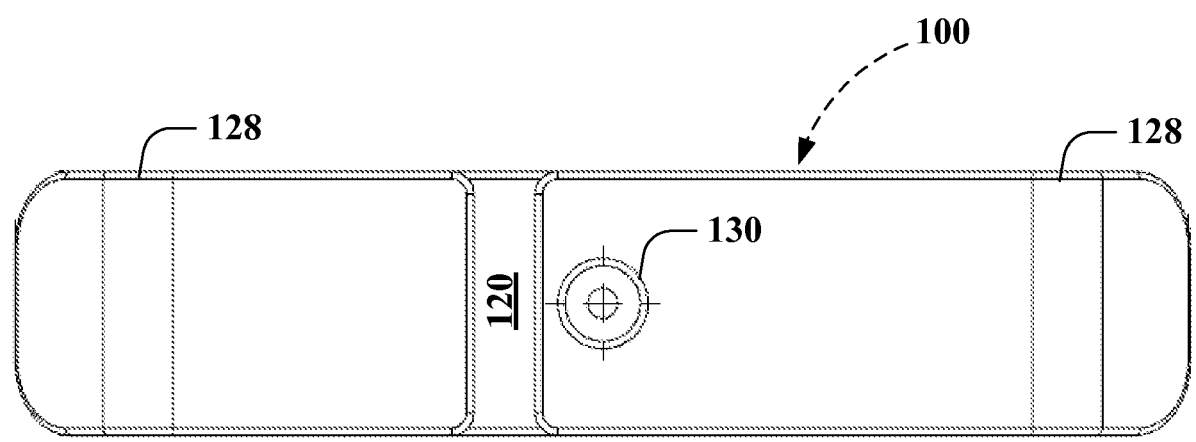
FIG. 1c is a top plan view of a cable management apparatus in accordance with the innovation.
Figure 1D:
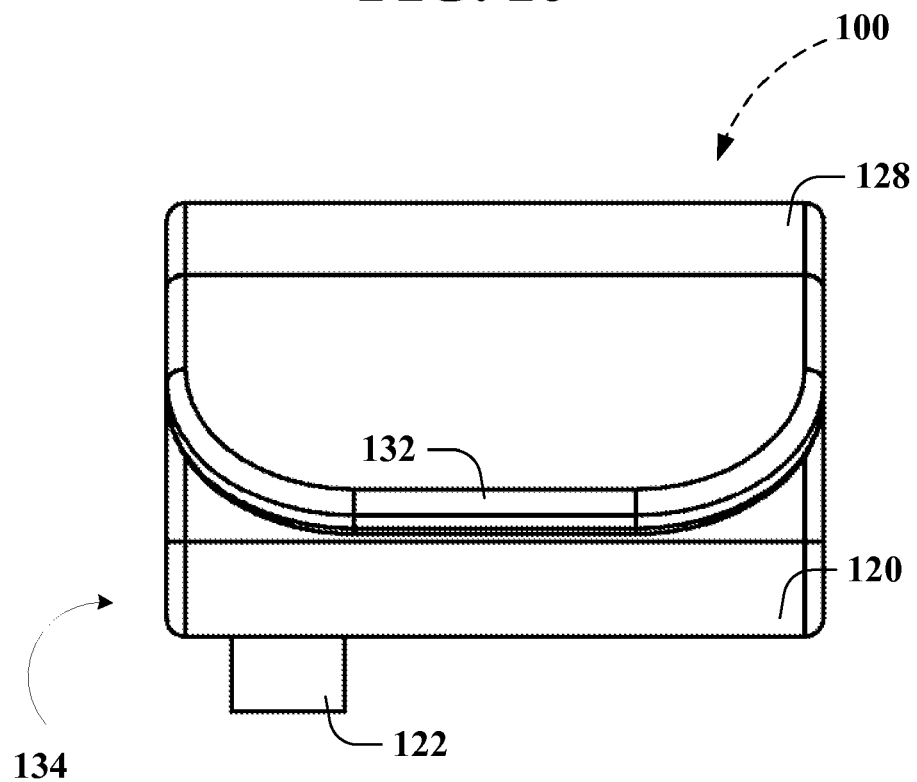
FIG. 1d is an end plan view of a cable management apparatus in accordance with the innovation.

As described herein, various embodiments of the present innovation relate generally to entertainment and/or multimedia furniture, and more specifically to cable management apparatus that can be employed independently or incorporated or integrated with entertainment center furniture such as, for example, but not limited to, multimedia furniture that houses media devices, consoles, computers, peripherals, and/or media storage. As shown in FIGS. 1a, 1b, 1c, and 1d, for instance, one of ordinary skill in the entertainment center art can appreciate that there are a variety of uses for a cable management apparatus 100. FIG. 1a is a perspective view of the cable management apparatus 100, FIG. 1b is a side plan view of the cable management apparatus 100, FIG. 1c is a front plan view of the cable management apparatus 100, and FIG. 1d is an end plan view of the cable management apparatus 100.

The cable management apparatus 100 includes a centrally disposed first cable confinement portion 102 mountable to a surface. A second cable confinement portion 104 extends from a first side 106 of the first cable confinement portion 102. A third cable confinement portion 108 extends from a second side 110 of the first cable confinement portion 102 opposite the first side such that the first, second, and third cable confinement portions 102, 104, and 108 are substantially aligned. With reference to FIG. 1b, and to ease understanding and illustration, the term first cable confinement portion refers to both the physical members employed to create a volume in which a cable may pass and to the volume created and reference numeral 102 is employed for referring to both. Reference numbers 104 and 108 are similarly employed to reference both the volume created and the physical members that define second cable confinement portion 104 and third cable confinement portions 108.

First cable confinement portion 102 includes a back mounting portion 120 that can include an attachment opening (not shown) and/or a guide member 122 that can be employed to position cable management apparatus 100 on a wall or other surface. First cable confinement portion 102 includes two front members 124 separated by a channel 126. The second cable confinement portion 104 and the third cable confinement portions 108 both extend from the first cable confinement portion 102 outward at first linearly until arcing toward the mounting surface direction 127 at 128 with an angle $\theta_1$. $\theta_1$ can be any suitable angle such as any angle between 10 and 80 degrees. As illustrated, $\theta_1$ can be about 45-65 degrees, but in another exemplary non-limiting embodiment, $\theta_1$ can be between 20 and 70 degrees.

Additionally, although illustrated with the second cable confinement portion 104 and the third cable confinement portions 108 both arcing toward the mounting surface direction 127 at 128 with the same angle, it should be appreciated that different angles can be employed. In other words, one angle can be employed with respect to the second cable confinement portion 104 and another angle employed with respect to the third cable confinement portions 108. In one non-limiting exemplary embodiment, one or more of the first cable confinement portion 102, the second cable confinement portion 104, and the third cable confinement portions 108 include an opening 130 for receiving a cable. Moreover, there can be a plurality of first cable containment portions 102, such that instead of three aligned cable containment portions (102, 104, 108), there can be N aligned cable containment portions where N can be an integer greater than 3.

As best illustrated in FIGS. 1d and 1b, the second cable confinement portion 104 and the third cable confinement portions 108 terminate at unattached ends 132 which are distanced such that with back mounting portion 120 mounted to a surface, the ends 132 do not contact the surface, creating channels at 134. Therefore each of the three containment portions are in flow communication with the environment and each other via the channels 126 and 134. The ends are flexible also in part due to channels 134. Also, because channel 126 of first cable containment portions 102, the members 124 can flex, and with sufficient lateral force applied to a cable in any of the containment portions, the cable can be pulled out of the containment portion through the channels 126 or 134.

In use, cable management apparatus 100 facilitates the routing and storing of cable as set forth below in more detail. More particularly, cable management apparatus 100 can hold one type of cable in the first cable confinement portion 102, a second type of cable in the second cable confinement portion 104, and a third type of cable in the third cable confinement portions 108 if desired. For example, power cords can be held in the first cable confinement portion 102, audio cables can be held in the second cable confinement portion 104, and video cables can be held in the third cable confinement portion 108. Additionally cable management apparatus 100 can be employed for looping cable as illustrated below in FIGS. 3-4 to facilitate cable storage.

In other words, the cable management apparatus 100 is, in one exemplary non-limiting embodiment, a one-piece unitary easily manufactured and economical product that both facilitates the routing of cable and the storage of extra lengths of cable. Additionally because the cable routing opening 130 is perpendicular to the confinement portions 102, 104, and 108, the cable management apparatus 100 facilitates the changing of direction of cable.

In one exemplary non-limiting embodiment, cable management apparatus 100 can be fabricated though a molding process and from an Acrylonitrile Butadiene Styrene (ABS) plastic that is a copolymer made by polymerizing styrene and acrylonitrile in the presence of polybutadiene. The proportions can vary from 15 to 35% acrylonitrile, 5 to 30% butadiene, and 40 to 60% styrene. The result can be a long chain of polybutadiene crisscrossed with shorter chains of poly (styrene-co-acrylonitrile). The nitrile groups from neighboring chains, being polar, attract each other and bind the chains together, making ABS stronger than pure polystyrene. The styrene gives the plastic a shiny, impervious surface. The butadiene, a rubbery substance, provides resilience even at low temperatures. ABS can be employed between −25 and 60° C.

In another exemplary non-limiting embodiment, the cable management apparatus 100 can be fabricated from a non-ABS plastic such as polypropylene, low-density polyethylene (LDPE), and/or high-density polyethylene (HDPE). In another exemplary non-limiting embodiment, cable management apparatus 100 can be fabricated from a non-plastic material such as, for example, but not limited to, metal, rubber, wood, and/or ceramic. In embodiments employing material that is not relatively flexible, if the material has a sufficient thinness, then the flexibility will be maintained or obtained. For example, with some metals, end 132 can be thinner than with other metals depending on the different properties of the different metals. Additionally, the cable management apparatus 100 can be made through processes other than molding such as, for example, but not limited to machining and welding. The attachment openings allow for the cable management apparatus 100 to be surface mounted to a structure such as a back wall of an entertainment center. The attachment can be with any known fastener such as for example a nail, a screw, or other fasteners. The cable management apparatus 100 can be surface mounted not employing the attachment opening such as for example using an adhesive to glue cable management apparatus 100 to the surface of a structure such as a back wall of an entertainment center. For example, an installer aligns the cable management apparatus employing guide member 122 to a wall or other suitable surface and then fastens the cable management apparatus employing one or more of the just described methods or apparatus.

Exemplary Non-Limiting Stepped Cable Management Apparatus

Figure 2A:
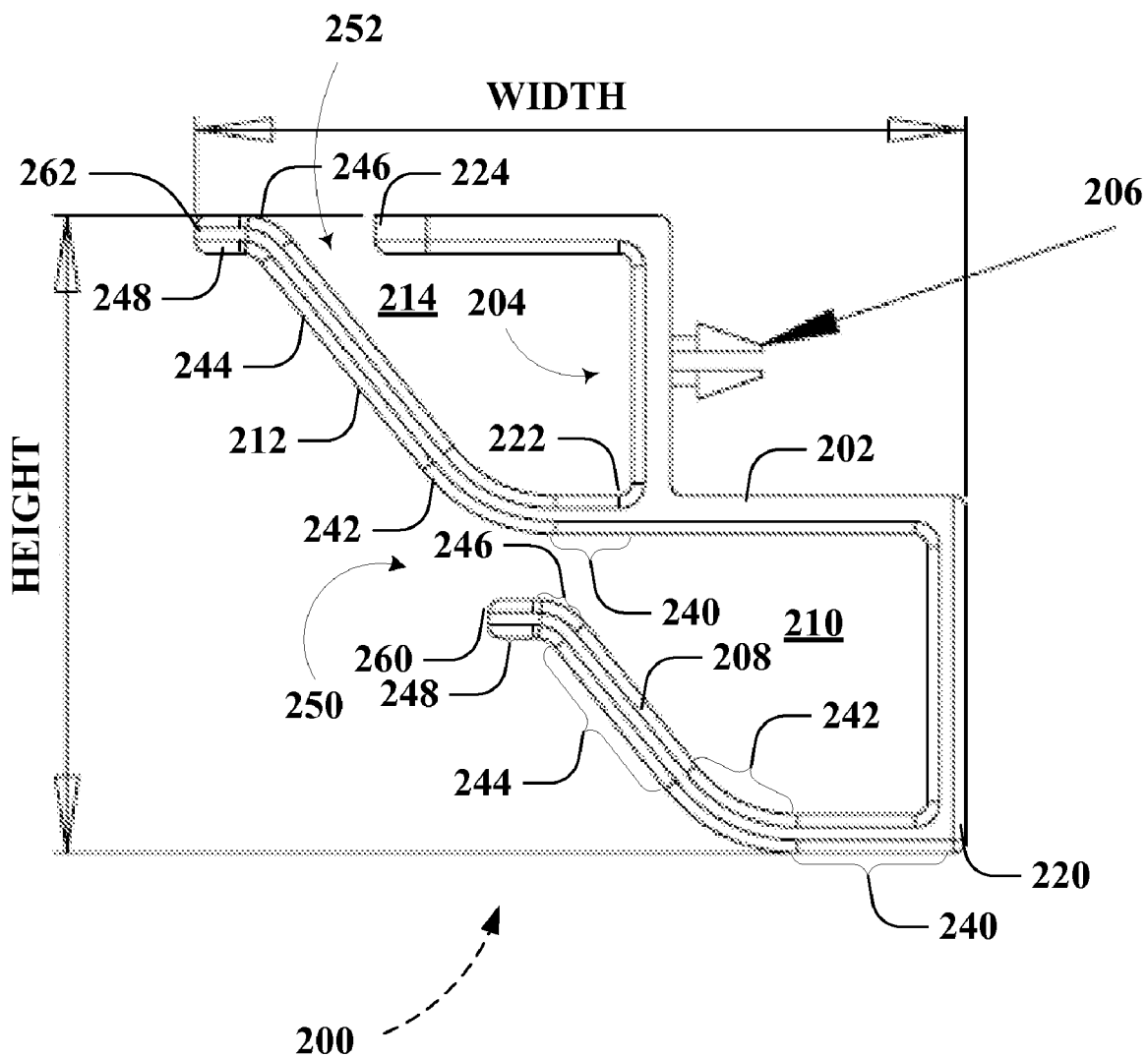
FIG. 2a is a side plan view of a stepped cable management apparatus in accordance with the innovation.
Figure 2B:
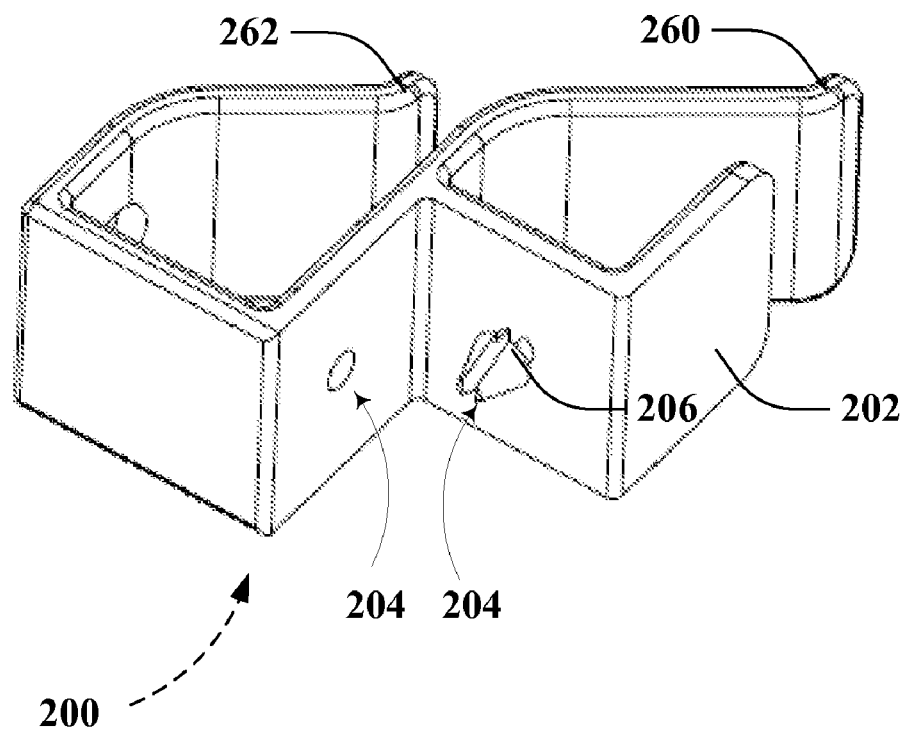
FIG. 2b is a back perspective view of a stepped cable management apparatus in accordance with the innovation.
Figure 2C:
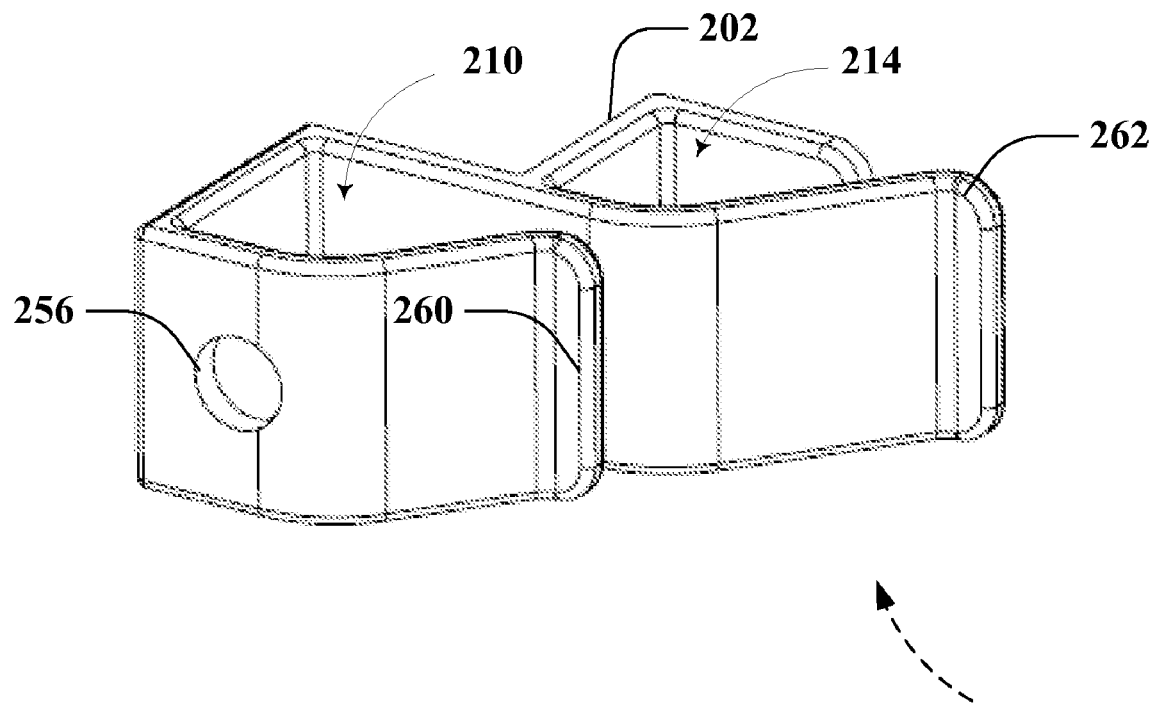
FIG. 2c is a front perspective view of a stepped cable management apparatus in accordance with the innovation.

FIGS. 2a, 2b, and 2c illustrate an aspect of the innovation in which a stepped cable management apparatus 200 is provided. The cable management apparatus 200 includes a stepped mounting member 202 having one or more attachment openings 204 employable to mount or attach cable management apparatus 200 to a surface or structure. A snap fastener 206 can be placed in openings 204 to facilitate cable management apparatus 200 being snap fastened to the surface or the structure. Alternatively, cable management apparatus 200 can be surface mounted employing the attachment opening 204 and a non-snap fastener such as a nail or a screw. The cable management apparatus 200 can be surface mounted not employing the attachment opening such as for example using an adhesive to glue the cable management apparatus 200 to the surface of a structure such as a back wall of an entertainment center.

A first confinement member 208 extends from the stepped mounting member 202 forming a first confinement channel 210. A second confinement member 212 extends from the stepped mounting member 202 forming a second confinement channel 214. More specifically, the first confinement member 208 extends from the stepped mounting member 202 at a first end 220. The second confinement member 212 extends from the stepped mounting member 202 at a middle step 222. The attachment opening 206 can be positioned between the middle step 222 and a second end 224 distal the first end 220. Stepped cable management apparatus 200 has a height H and a Width W and in one exemplary non-limiting embodiment, W is greater than H. In another exemplary non-limiting embodiment, H is greater than W. And in yet another exemplary non-limiting embodiment, H is equal to W. Both the first and the second confinement members 208 and 212 include a first linearly extending section 240, a second arcuately extending section 242, a third linearly extending section 244, a fourth arcuately extending section 246, and a last (and fifth) linearly extending section 248.

However, the section lengths are not the same between first and the second confinement members 208 and 212. For example, the third linearly extending section 244 is longer in the second confinement member 212 than in the first confinement member 208. The net result of the differences in section length is that the second confinement member 212 extends longer in both the vertical and horizontal directions than the first confinement member 208. This difference in extension results in the first confinement channel 210 having an opening (channel) 250 in one direction while the second confinement channel 214 has an opening (channel) 252 in a different direction. More specifically the channels 210 and 214 are perpendicular to each other. Although illustrated with two channels, it should be appreciated that there could be more than two channels. For example, there could be N channels where N can be an integer greater than 2.

As best illustrated in FIG. 2c, at least one cable routing opening 256 can be provided on the cable management apparatus 200 in one exemplary non-limiting embodiment. As illustrated in FIG. 2c, the cable routing opening 256 can be perpendicular to the channels 210 and 214. As best illustrated in FIG. 2b, there can be a plurality of attachment openings 204 such that a user can decide in what orientation to attach cable management apparatus 200 to a structure or surface.

In use, cable management apparatus 200 facilitates the routing and storing of cable as set forth below in more detail. More particularly, cable management apparatus 200 can hold one type of cable in the first cable confinement channel 210 and a second type of cable in the second cable confinement channel 214. For example, power cords can be held in the first cable confinement channel 210 and audio/video cables can be held in the second cable confinement channel 214. Additionally cable management apparatus 200 can be employed for looping cable as illustrated below with respect to cable management apparatus 100 in FIGS. 3-4 to facilitate cable storage. In other words, the cable management apparatus 200 is, in one exemplary non-limiting embodiment, a one-piece unitary easily manufactured and economical product that both facilitates the routing of cable and the storage of extra lengths of cable. Additionally because the cable routing opening 256 can be perpendicular to the channels 210 and 214, the cable management apparatus 200 facilitates the changing of direction of cable. The cable management apparatus 200 can be fabricated as described with respect to cable management apparatus 100. Members 208 and 212 terminate at ends 260 and 262 and are flexible such that cable can be pulled out of the cable management apparatus 200 with sufficient force.

Figure 3:
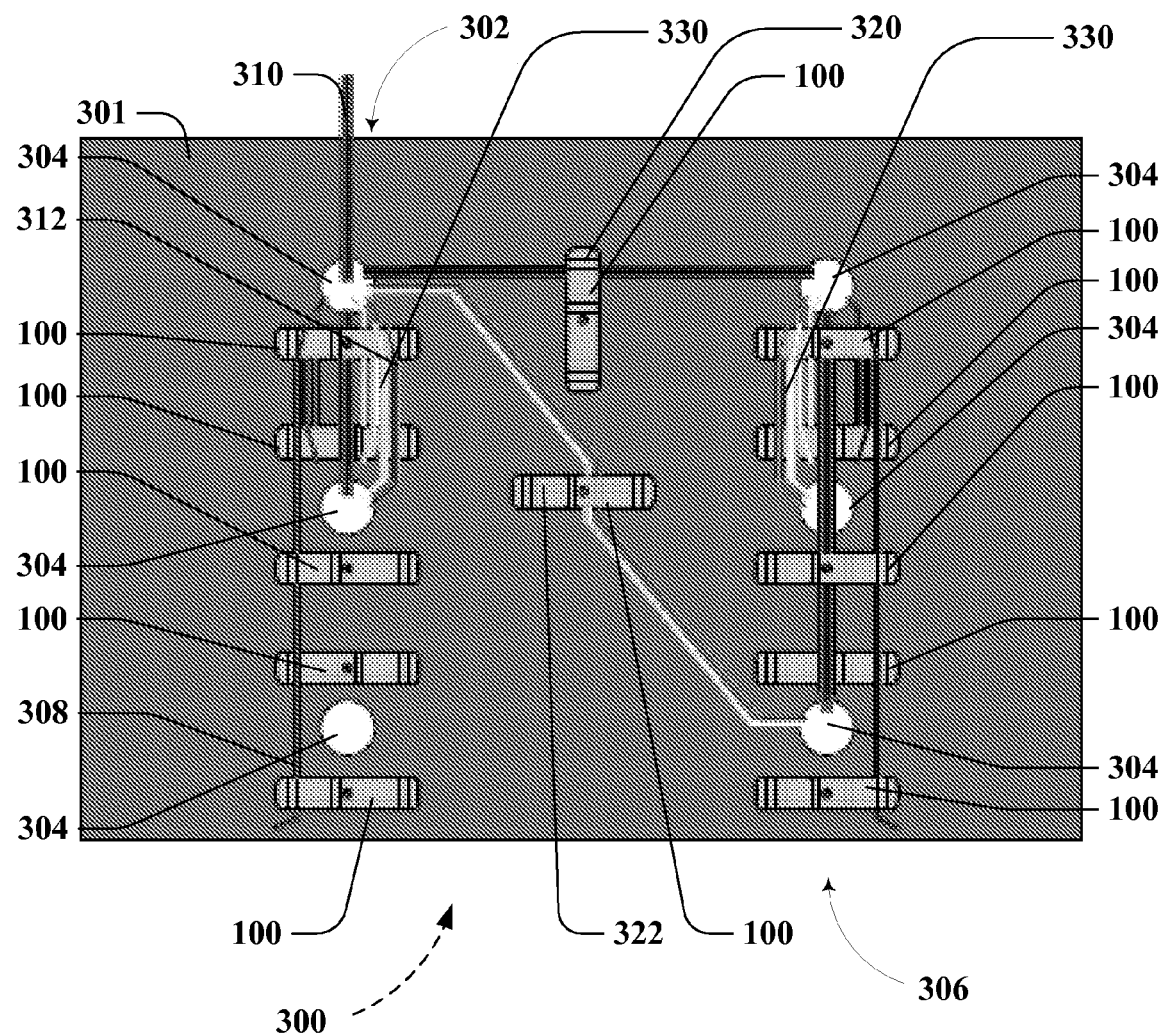
FIG. 3 illustrates a plurality of cable management apparatus mounted to a wall such as, for example, but not limited to a back wall of an entertainment center in accordance with the innovation.

FIG. 3 illustrates a plurality of cable management apparatuses 100 mounted in a routing environment 300 to a surface 301 such as, for example, but not limited to a back wall of an entertainment center. The surface can be of any structure such as a wall or rack behind a display in a store or other location (such as a trade show) displaying wired devices such as media devices. The cable management apparatuses 100 are arranged in a vertical stack 302. The surface 301 includes a plurality of openings 304 that allow for cable to go through the surface. A second vertical stack 306 horizontally disposed from the first vertical stack 302 is also illustrated. A first cable type 308 can be routed through the left side of the cable management apparatuses 100, a second cable type 310 can be routed through the middle containment portions of the cable management apparatuses 100, and a third cable type 312 can be routed through the right side of the cable management apparatuses 100.

A cable management apparatus 100 (320) can be horizontally disposed and positioned between the first and second vertical stacks 302 and 306. The horizontally disposed cable management apparatus 320 can be horizontally disposed because it routes cable horizontally because cable management apparatus's 320 containment portions point (or direct cable) in the horizontal direction. There is also illustrated an additional cable management apparatus 100 (322) that can be vertically disposed and positioned between the first and second vertical stacks 302 and 306. As can be appreciated by looking at the top portions of the first and second vertical stacks 302 and 306, excess cable can be looped at 330.

Figure 4:
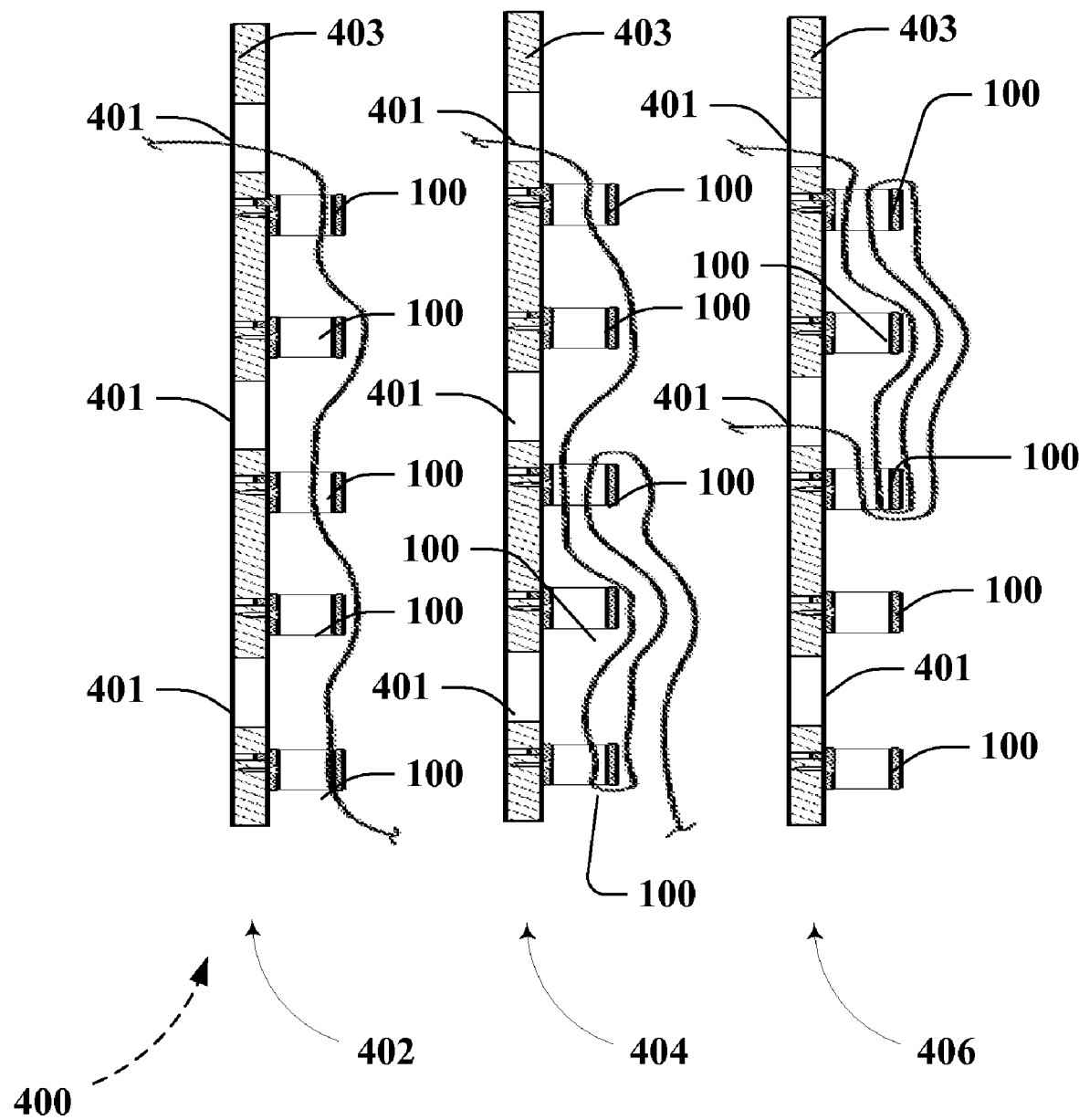
FIG. 4 illustrates examples for employing a plurality of cable management apparatuses mounted to a wall in accordance with the innovation.

FIG. 4 illustrates examples 400 for employing a plurality of cable management apparatuses 100 mounted to a wall 403 such as, for example, but not limited to a back wall of an entertainment center. The wall 403 includes a plurality of openings 401 that allow for cable to go through the wall 403. The cable management apparatuses 100 are arranged vertically in a vertical stack formation as illustrated in FIG. 3. At 402, it is illustrated an example of employing the plurality of cable management apparatuses 100 to pass a cable through an opening 401. At 404, it is illustrated an example of employing the plurality of cable management apparatuses 100 to pass a cable through an opening 401 and to store excess cable length by looping the cable around different cable management apparatuses 100. The cable management apparatuses 100 are both appropriately sized and positioned such that the cable is not bent past the cable's bend radius when being looped around a cable management apparatus 100. The bend radius, which can be measured to the inside curvature, can be the minimum radius one can bend a pipe, tube, sheet, cable or hose to without kinking it, damaging it, or shortening its life.

At 406, it is illustrated an example of employing the plurality of cable management apparatuses 100 to pass a cable through several openings 401 and to store excess cable length by looping the cable around different cable management apparatuses 100. The example at 406 is an example where the cable connects one media device to another media device such as, for example, but not limited to, a DVD player can be connected to a TV, or a game console can be connected to the TV, and wherein it can be desirable to store excess wire (cable) employing the cable management apparatuses 100. Both walls 300 and 403 can be a wall behind a display in a store or other location (such as a trade show) displaying wired devices such as media devices.

Figure 5:
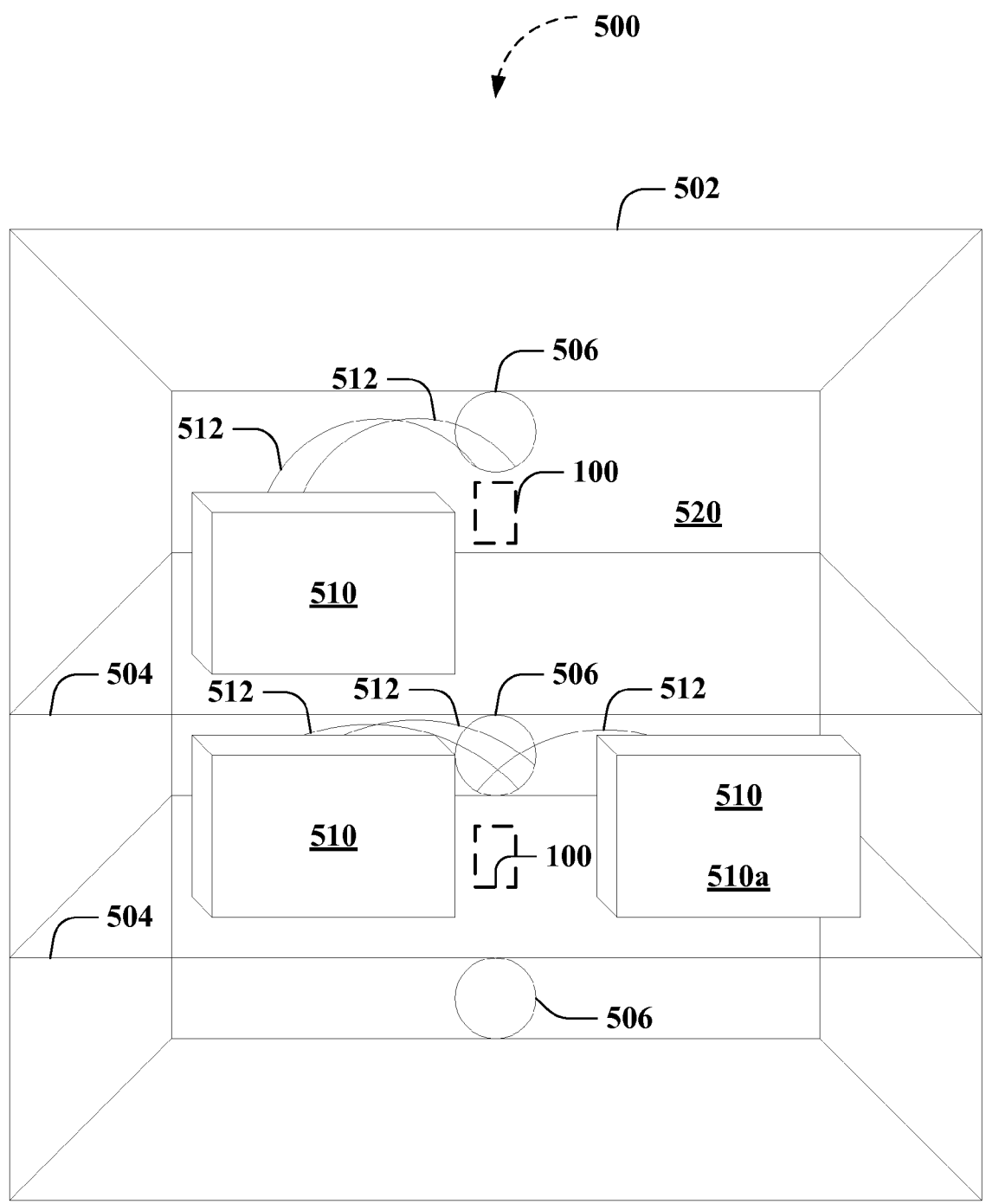
FIG. 5 illustrates a furniture structure environment.

FIG. 5 illustrates a furniture structure environment 500. An entertainment cabinet 502 includes a plurality of shelves 504 and a plurality of openings 506. The shelves 504 are such that a plurality of media devices 510 can be placed or positioned on the shelves. One media device 510 can be a display device 510a. Each device has at least one associated cable 512, but it should be appreciated that objects without cables can be placed or positioned on the shelves 504. The entertainment cabinet 502 includes a back wall 520 similar to the walls shown in FIGS. 3-4, and two cable management apparatuses 100 are shown in phantom positioned on a backside (not shown) of wall 520. It should be appreciated that multiple cable management apparatus 100 can be positioned or placed on wall 520 in arrangements as illustrated in FIGS. 3-4 as well as any other arrangement.

Figure 6:
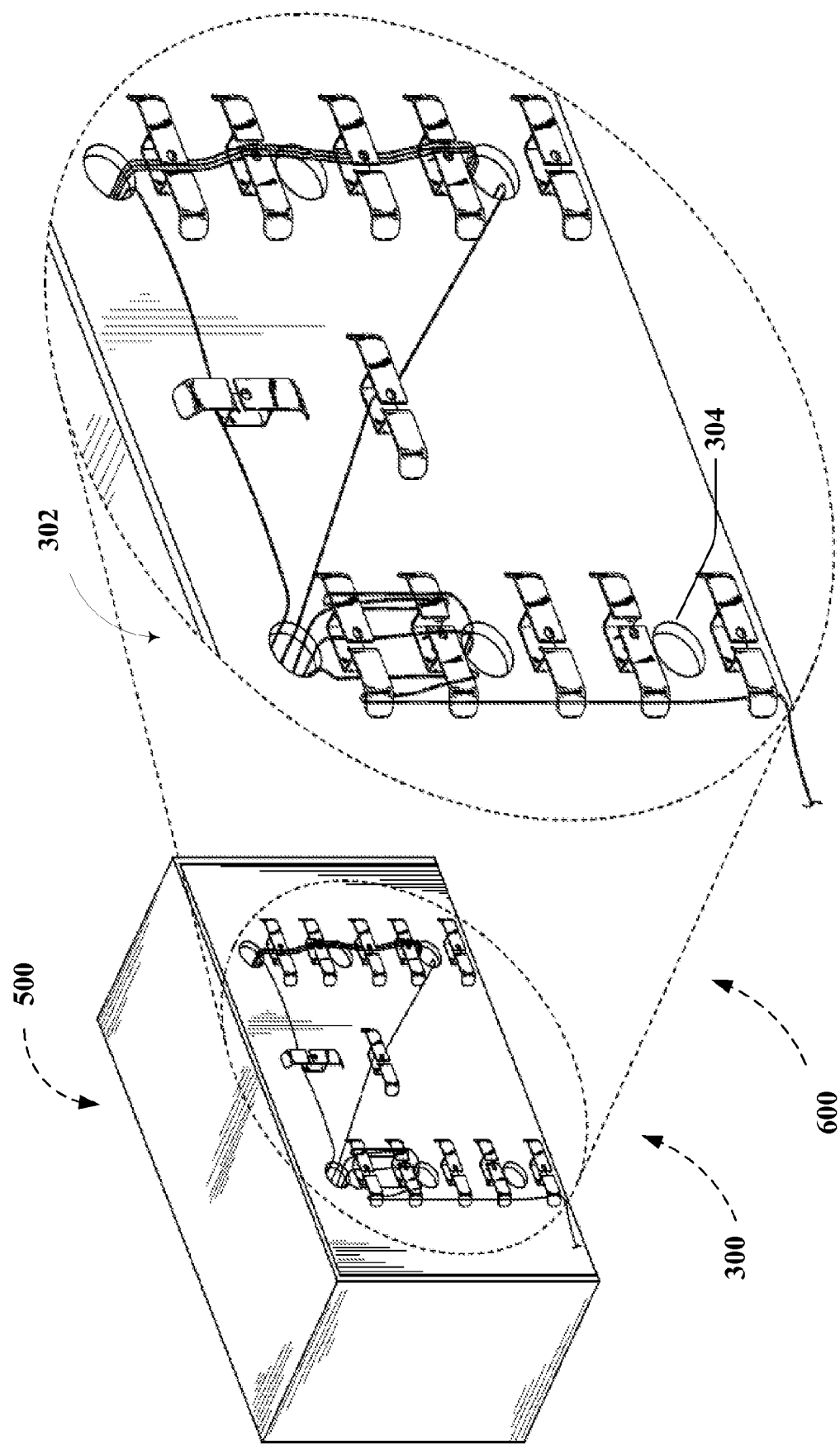
FIG. 6 illustrates a furniture structure environment.

FIG. 6 illustrates a furniture structure environment 600 including environment 500 and routing environment 300. As described with respect to routing environment 300 above, the cable management apparatuses 100 are arranged in a vertical stack 302. The surface includes a plurality of openings 304 that allow for cable to go through the surface. A second vertical stack horizontally disposed from the first vertical stack is also illustrated.

While the present innovation has been described in connection with the exemplary embodiments of the various Figures, it is to be understood that other similar embodiments may be employed or modifications and additions may be made to the described embodiment for performing the same function of the present innovation without deviating therefrom. For example, one skilled in the art will recognize that the present innovation as described in the present application may apply to any cable management environment, and may be applied to any number of such devices, peripherals, and storage. Therefore, the present innovation should not be limited to any single embodiment, but rather should be construed in breadth and scope in accordance with the appended claims.

What is claimed is:

1. A cable management apparatus including:
   a centrally disposed first cable confinement portion mountable to a surface, said first cable confinement portion providing at least partial confinement in at least two dimensions;
   a second cable confinement portion extending from a first side of the first cable confinement portion; and
   a third cable confinement portion extending from a second side of the first cable confinement portion opposite the first side such that the first, second, and third cable confinement portions are substantially aligned, wherein the first cable confinement portion comprises a back plate with at least one of an attachment opening or a guide member thereon.

2. The cable management apparatus of claim 1, wherein the first cable confinement portion comprises two front members separated by a channel.

3. The cable management apparatus of claim 1, wherein the second and third cable confinement portions extend and terminate at unconnected flexible ends.

4. The cable management apparatus of claim 1, wherein at least one of the second and third cable confinement portions include a cable routing opening.

5. The cable management apparatus of claim 1, wherein the second cable confinement portion extends from the first side of the first cable confinement portion in a first direction and then transitions to extend in a second direction different from the first direction.

6. The cable management apparatus of claim 1, wherein the third cable confinement portion extends from the second side of the first cable confinement portion in a first direction and then transitions to extend in a second direction different from the first direction.

7. A cable management apparatus, including:
a centrally disposed first cable confinement portion mountable to a surface, said first cable confinement portion providing at least partial confinement in at least two dimensions;
a second cable confinement portion extending from a first side of the first cable confinement portion; and
a third cable confinement portion extending from a second side of the first cable confinement portion opposite the first side such that the first, second, and third cable confinement portions are substantially aligned,
wherein the first cable confinement portion comprises two front members separated by a channel and wherein the second cable confinement portion extends from the first side of the first cable confinement portion at first linearly and then arcs in a mounting surface direction.

8. A cable management apparatus, including:
a centrally disposed first cable confinement portion mountable to a surface, said first cable confinement portion providing at least partial confinement in at least two dimensions;
a second cable confinement portion extending from a first side of the first cable confinement portion; and
a third cable confinement portion extending from a second side of the first cable confinement portion opposite the first side such that the first, second, and third cable confinement portions are substantially aligned,
wherein the second cable confinement portion extends from the first side of the first cable confinement portion at first linearly and then arcs in a mounting surface direction.

9. The cable management apparatus of claim 8, wherein the third cable confinement portion extends from the second side of the first cable confinement portion at first linearly and then arcs in the mounting surface direction.

10. The cable management apparatus of claim 9, wherein the second and third cable confinement portions extend and terminate at unconnected ends such that the unconnected ends are flexible.

11. A cable management system including:
a plurality of cable management apparatus arranged on a surface, wherein each cable management apparatus includes:
a centrally disposed first cable confinement portion mounted to the surface, said first cable confinement portion providing at least partial confinement in at least two dimensions;
a second cable confinement portion extending from a first side of the first cable confinement portion; and
a third cable confinement portion extending from a second side of the first cable confinement portion opposite the first side such that the first, second, and third cable confinement portions are substantially aligned.
wherein for each cable management apparatus, the second and third cable confinement portions extend at first linearly and then arcing toward the surface and terminating at unconnected ends such that the unconnected ends are flexible.

12. The cable management system of claim 11, wherein the plurality of cable management apparatus arranged on the surface in a first vertical stack.

13. The cable management system of claim 12, further including a second vertical stack horizontally disposed with relation to the first vertical stack.

14. The cable management system of claim 13, further including an additional cable management apparatus positioned horizontally between the first and second stacks.

15. The cable management system of claim 11, wherein the surface includes a plurality of cable routing openings.

16. The cable management system of claim 11, wherein the second cable confinement portion of each cable management apparatus extends from the first side of the first cable confinement portion in a first direction and then transitions to extend in a second direction different from the first direction.

17. The cable management system of claim 11, wherein the third cable confinement portion of each cable management apparatus extends from the second side of the first cable confinement portion in a first direction and then transitions to extend in a second direction different from the first direction.

* * * * *